United States Patent [19]

Taniguchi

[11] Patent Number: 5,325,349

[45] Date of Patent: Jun. 28, 1994

[54] HARD DISC DRIVE AND A SERVO SIGNAL WRITING APPARATUS

[75] Inventor: Kayoko Taniguchi, Kanagawa, Japan

[73] Assignee: Sony Magnescale Inc., Tokyo, Japan

[21] Appl. No.: 887,824

[22] Filed: May 26, 1992

[30] Foreign Application Priority Data

May 29, 1991 [JP] Japan ................................ 3-126219
May 29, 1991 [JP] Japan ................................ 3-126220

[51] Int. Cl.⁵ ........................ G11B 5/596; G11B 7/00
[52] U.S. Cl. ................................ 369/109; 369/44.14;
369/44.19; 369/215; 369/222; 360/77.03
[58] Field of Search ............... 369/109, 44.11, 44.14,
369/44.19, 215, 220, 222, 244; 360/104, 105,
106, 107, 108, 109, 69, 70, 75, 77.02, 77.03,
77.08, 78.04

[56] References Cited

U.S. PATENT DOCUMENTS

| | | | |
|---|---|---|---|
| 4,794,586 | 12/1988 | Korth | 369/215 |
| 4,797,754 | 1/1989 | Sugano et al. | 360/62 |
| 5,079,755 | 1/1992 | Hangai et al. | 369/44.11 |
| 5,121,371 | 6/1992 | Farnsworth et al. | 369/44.26 |
| 5,140,571 | 8/1992 | Nishida et al. | 369/44.11 |
| 5,162,955 | 11/1992 | Burdenko | 360/77.03 |
| 5,164,863 | 11/1992 | Janz | 360/57 |
| 5,179,485 | 1/1993 | Tamayama | 360/77.03 |
| 5,193,034 | 3/1993 | Tsuyoshi et al. | 360/51 |

Primary Examiner—Paul M. Dzierzynski
Assistant Examiner—Drew A. Dunn
Attorney, Agent, or Firm—Jay H. Maioli

[57] ABSTRACT

A hard disc drive is comprised of a casing, a head arm located in the casing and movable in unison with a head, and a diffraction grating mounted on the head arm so as to diffract a light introduced into the casing from the outside of the casing, in which a light diffracted by the diffraction grating is introduced to the outside of the casing. Also, this hard disc drive further comprises an optical system provided outside the casing for receiving the diffracted light, the optical system detecting the arm position, a controller for controlling the arm position, and a servo signal writer for writing a servo signal on the disc on the basis of a detected signal.

15 Claims, 3 Drawing Sheets

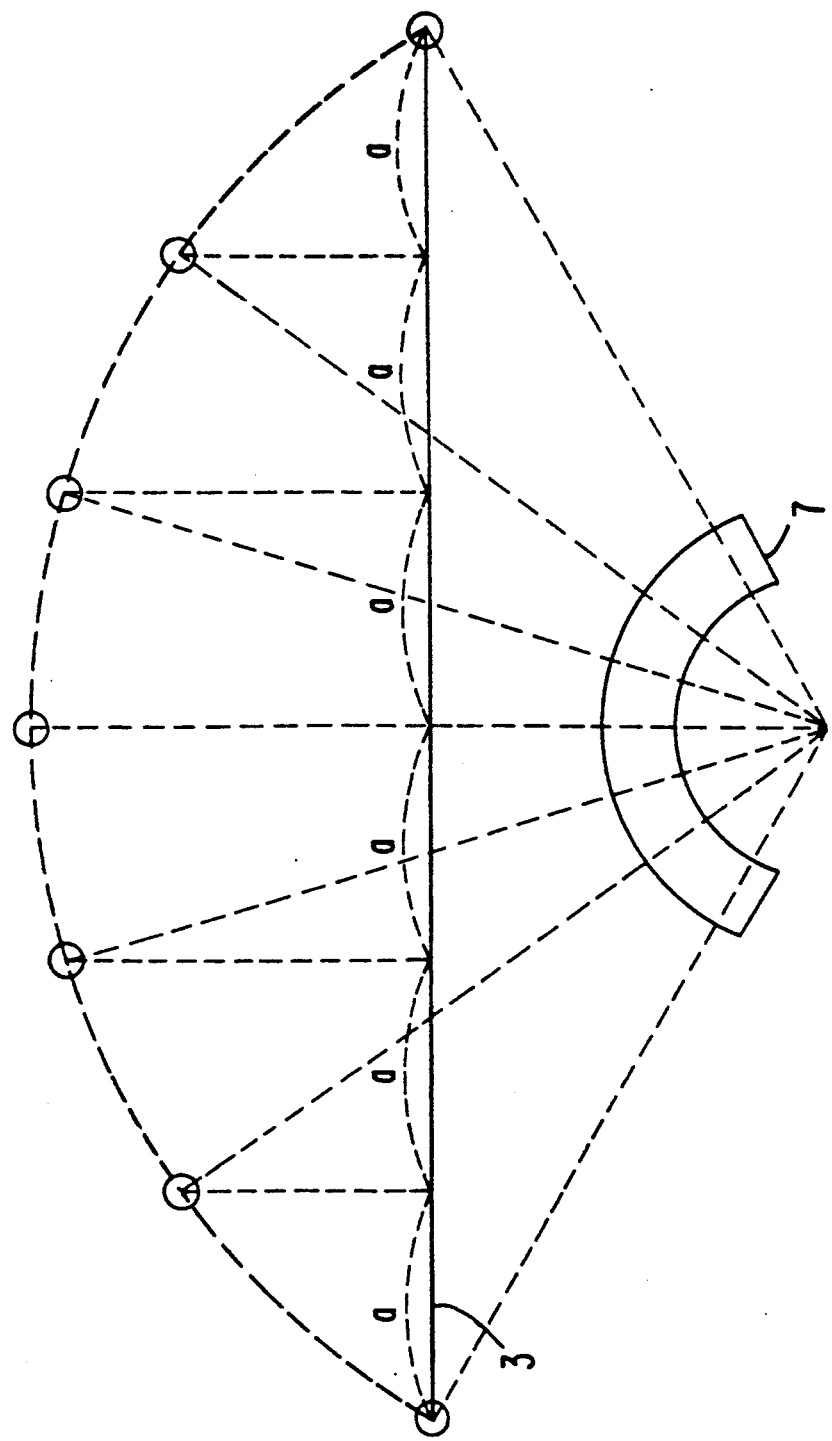

HARD DISC DRIVE AND A SERVO SIGNAL WRITING APPARATUS

BACKGROUND OF THE INVENTION

1. Field of the Invention

The present invention relates to a hard disc drive (HDD) and a servo signal writing apparatus which are both suitable for detecting the head position.

2. Description of the Related Art

External control type hard disc drives are known to write a servo signal as follows:

A head arm is secured to a moving body provided outside the casing of the hard disc drive and a motion of the moving body is detected by means of some suitable methods, such as a light interference method or the like. Then, on the basis of detected results, the position of the head arm is controlled, i.e., the writing of the servo signal is controlled.

Further, there are known other hard disc drives which include a mirror attached to a head arm to detect the position of the head on the basis of motion of the mirror or other hard disc drives in which a rotary encoder and an optical system for detecting the head position are disposed within the casing thereof.

Hard disc drives are miniaturized more and hence rigidity of the head is decreased, which causes the external control type of hard disc drive to deform the head arm thereof. Also, conditions of the hard disc drives are different when in use and when in the recording mode. There is the disadvantage that a servo signal cannot be written with high accuracy as expected.

According to the above-mentioned other hard drive drives in which the mirror is attached to the head, a load applied to the head tends to change the condition of the head when in the recording mode and in use. As a result, accuracy in the writing of servo signal cannot be increased as expected and resolution also is lowered.

Further, according to the above-mentioned other type of hard disc drives in which the rotary encoder and the like are disposed within the casing, the cost of optical parts is increased.

OBJECTS AND SUMMARY OF THE INVENTION

Accordingly, it is an object of the present invention to provide an improved hard disc drive in which the aforesaid shortcomings and disadvantages encountered with the prior art can be eliminated.

More specifically, it is an object of the present invention to provide a hard disc drive in which conditions in the recording mode and in use can be prevented from being changed, thereby increasing recording accuracy considerably.

Another object of the present invention is to provide a hard disc drive in which a recording speed can be increased.

Still another object of the present invention is to provide a hard disc drive in which a casing is kept in a hermetic fashion to enable the hard disc drive to be operable in the recording mode in the place other than the clean room.

Still another object of the present invention is to provide a hard disc drive which can be made inexpensive.

A further object of the present invention is to provide a hard disc drive whose optical system can be simplified.

Still a further object of the present invention is to provide a hard disc drive in which a diffraction efficiency can be increased and hence a signal-to-noise ratio (S/N ratio) can be improved.

Still a further object of the present invention is to provide a hard disc drive in which a recording density can be increased.

Still a further object of the present invention is to provide a hard disc drive in which a head position can be controlled with ease.

Yet a further object of the present invention is to provide a hard disc drive in which a position at which the writing of a servo signal is started can be detected accurately and readily.

Yet a further object of the present invention is to provide a servo signal writing apparatus which can be efficiently assembled in the assembly process thereof.

Yet a further object of the present invention is to provide a servo signal writing apparatus in which a resolution can be improved.

According to an aspect of the present invention, a hard disc drive is comprised of a casing, a head arm having a head and movable within the casing, and a diffraction grating mounted on the head arm so as to diffract a light introduced into the casing from the outside of the casing, in which a light diffracted by the diffraction grating is introduced to the outside of the casing. Also, this hard disc drive further comprises an optical system provided outside the casing for receiving the diffracted light, the optical system detecting the arm position, a control circuit for controlling the arm position, and a servo signal writing device for writing a servo signal on the disc on the basis of a detected signal.

BRIEF DESCRIPTION OF THE DRAWINGS

A better understanding of other objects, features, and advantages of the present invention can be gained from a consideration of the following detailed description of an illustrative embodiment thereof, in conjunction with the figures of the accompanying drawings, in which:

FIG. 3 is a diagram used to explain a relation between a pitch of a diffraction grating and a track pitch of a disc.

DETAILED DESCRIPTION OF THE PREFERRED EMBODIMENT

The present invention will now be described with reference to the drawings.

Figure 1:
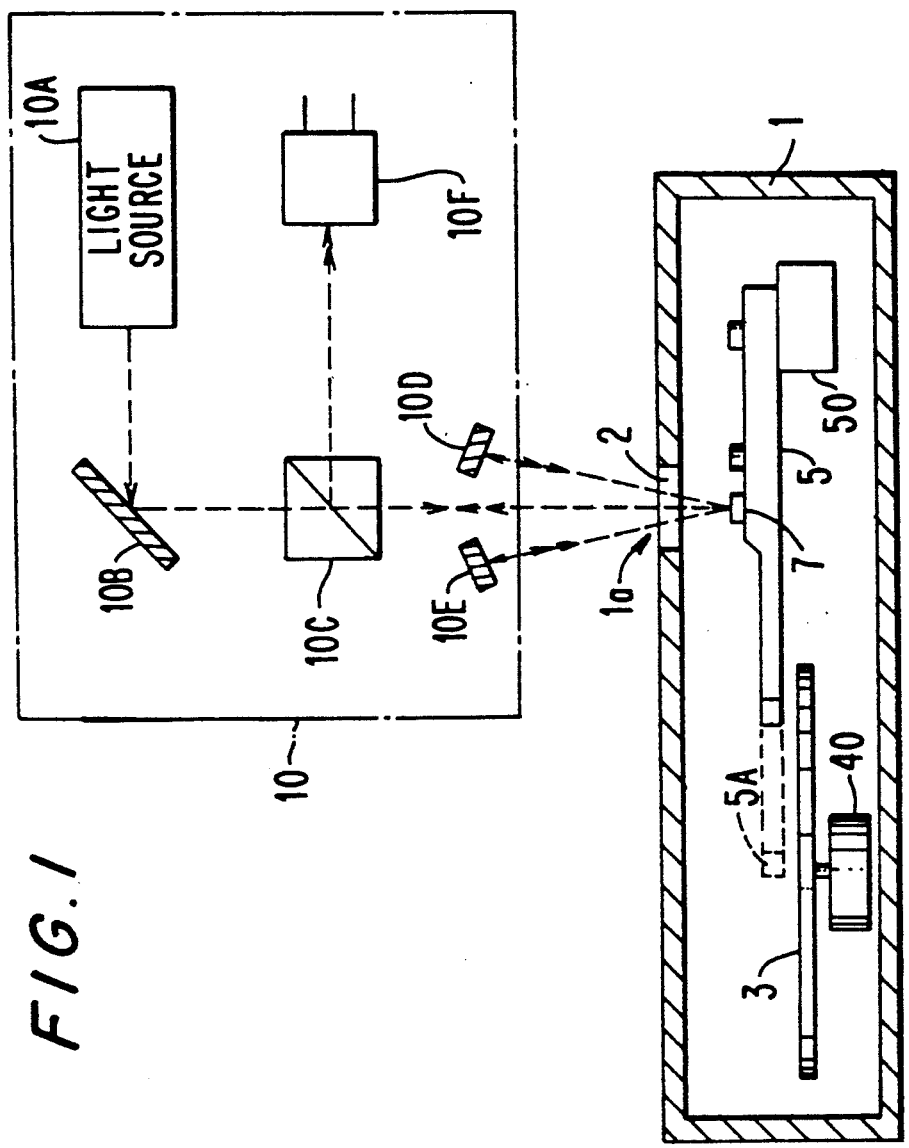
FIG. 1 is a schematic diagram showing an entire configuration of an embodiment of a hard disc drive according to the present invention.
Figure 2:
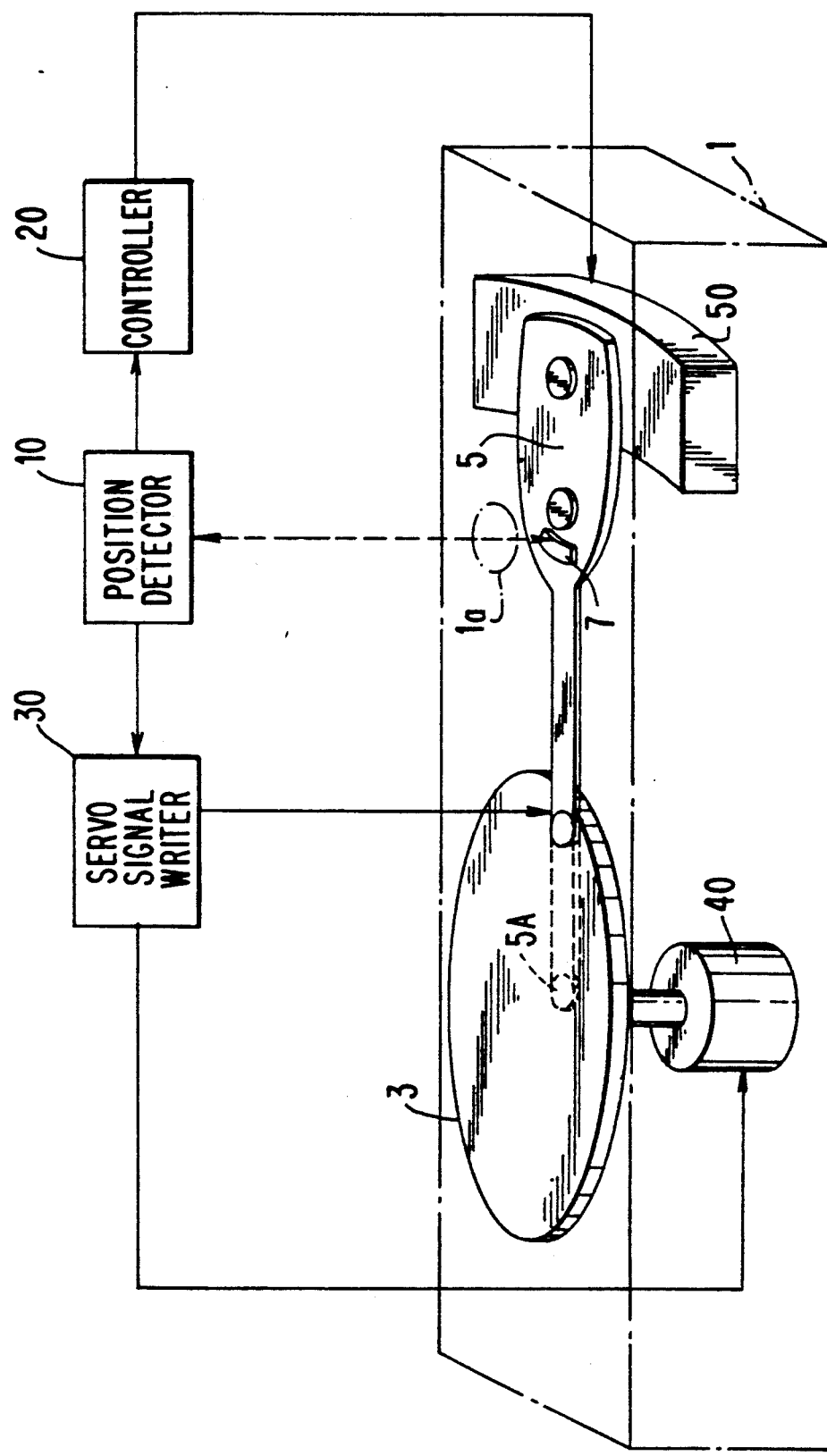
FIG. 2 is a schematic diagram showing a servo signal writing apparatus or the like in a perspective fashion.

FIGS. 1 and 2 of the accompanying drawings show a hard disc drive and a servo signal writing apparatus according to the present invention, respectively.

Referring to FIGS. 1 and 2, a hard disc drive includes a casing 1 in which there are housed a disc 3 and a head arm 5. The head arm 5 having a head 5A mounted thereon is operated or moved by a voice coil motor 50, whereas the disc 3 is rotated by a motor 40.

A diffraction grating 7 is mounted on the head arm 5 and an opening portion 1a is bored through the casing 1 at its part corresponding to the diffraction grating 7.

The opening portion 1a is closed by a transparent material 2 such as acrylic resin, glass or the like, thereby keeping the inside of the casing 1 in a hermetic state.

The diffraction grating 7 might be freely formed as one of fixed, detachable, reflection types or hologram type.

Study of FIG. 3 demonstrates that the pitch pattern of the diffraction grating 7 is preferably formed so as to cause the disc 3 to have a constant track pitch a.

Further, it is preferable that an origin representative of the writing start position of the servo signal is formed on the diffraction grating 7.

The diffraction grating 7 might be formed by means of some suitable processes, such as a holography process, a lithography process, a process of the direct writing by electron beams or the like.

The grating configuration of the diffraction grating 7 must be made as small as possible because a weight of the diffraction grating 7 added to the head arm 5 can be reduced. Accordingly, if it is permitted that the diffraction grating 7 is high in freedom and slightly poor in cumulative pitch or the like, the diffraction grating 7 might be formed by bonding a polymer film (film on which an optically magnetizable material is coated) on the head arm 5.

An optical system 10 provided outside the casing 1 comprises a light source 10A which emits a laser light or the like, a mirror 10B for reflecting the light emitted from the light source 10A, a beam splitter 10C on which the light reflected by the mirror 10B becomes incident, two mirrors 10E and 10D for reflecting the light diffracted by the diffraction grating 7 from the beam splitter 10C so that the reflected-back light thus diffracted is introduced again into the diffraction grating 7 and a photo-detector 10F for receiving an interference light which results from splitting an interference light of the light twice diffracted by the beam splitter 10C.

In this case, when the head arm 5 is moved, then the diffraction grating 7 also is moved in unison with the head arm 5, thereby changing the phase of a diffracted light. Then, a light intensity of the interference light is changed in a sine wave fashion. Therefore, the position of the head 5A is detected by counting the sine wave.

As shown in FIG. 2, the detected signal from the optical system (position detector) 10 or photo-detector 10F is supplied to a servo signal writer 30 and a controller 20. Then, the voice coil motor 50 is controlled by the controller 20 while the motor 40 is controlled by the servo signal writer 30, thereby the servo signal being written on the disc 3A by the head 5A.

Selecting the pitch of the diffraction grating 7 to be 2 $\mu$m, a pitch at which a signal of an interference light is output becomes 0.5 $\mu$m. In this case, if an interpolation processing is carried out, then it is possible to obtain a signal having a smaller pitch.

It is preferable that the light source 10A may emit two laser lights with slightly different wavelengths. The laser lights emitted from the light source 10A are modulated to provide an interference light signal having a carrier signal.

As described above, according to this embodiment, the diffraction grating 7 is mounted on the head arm 5 and the light diffracted by the diffraction grating 7 is introduced into the optical system 10 provided outside the casing 1.

There is then no disadvantage such that a extra load or the like is applied to the head 5A. Therefore, the condition of the head 5A in the recording mode and in use is not changed, whereby accuracy in the recording mode is considerably increased and the recording speed also is increased.

Furthermore, since the opening portion 1a of the casing 1 is closed by the transparent material 2, the inside of the casing 1 is kept in hermetic state. As a result, the recording in the place other than the so-called clean room becomes possible and therefore the hard disc drive of the present invention becomes easy to handle. Also, it is possible to prevent the hard disc drive from being utilized under different conditions when the servo signal is recorded and when in use as the lid of the casing 1 is opened and/or closed. In other words, the hard disc drive of the present invention is free from a mechanical distortion or the like.

In addition, since the diffraction grating 7 is made detachable, the diffraction grating can be utilized a number of times, thereby making the hard disc drive inexpensive.

Further, since the diffraction grating is formed of the reflection type, the optical system 10 for detecting the head position need not be provided on both side surface sides of the diffraction grating 7 and hence the configuration of the optical system 10 can be simplified.

Further, since the hologram is employed as the diffraction grating 7, a diffraction efficiency can be increased and hence a signal-to-noise ratio (S/N ratio) can be increased.

In addition, since the pitch of the diffraction grating 7 is set such that the track pitch of the disc 3 becomes the constant value a, the writing of the servo signal can be effected while the track pitch of the disc 3 is made constant. Hence, the recording density can be increased and the position of the head 5A can be controlled with ease, thereby making the hard disc drive of the present invention easier to handle.

Since the origin for determining the position of the head 5A is formed on the diffraction grating 7, the position at which the writing of the servo signal is started can be detected accurately and readily.

In this case, even when the diffraction grating 7 is once removed from the head arm 5 after the servo signal was written on the disc 3, it becomes possible to confirm a servo signal, which is written again, by the same coordinates as those used before. Hence, it is possible to obtain data concerning the change of the disc 3 and the track position due to the deformation of the head arm and heat fluctuation or the like in the later process.

Furthermore, since the optical system 10 is of an optical interference type, the distance between the head 5A and the diffraction grating 7 can be increased, whereby a working property in the assembly process of the hard disc drive and servo signal writing apparatus can be increased and a resolution can be increased.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A hard disc driving comprising:
   a casing;
   a head arm having a head and being movably mounted within said casing; and a diffraction grating mounted on said head arm so as to diffract a beam of light introduced into said casing from the outside of said casing, whereby the beam of light diffracted by said diffraction grating is directed outside of said casing after it is diffracted, and whereby the diffracted beam of light indicates the position of the movably mounted head arm.

2. The hard disc drive according to claim 1, wherein said casing has an opening portion formed therethrough and said opening portion is closed by a transparent material, whereby said beam of light directed outside of said casing is directed through the transparent material.

3. The hard disc drive according to claim 2, wherein said diffraction grating is made detachable from said head arm.

4. The hard disc drive according to claim 1, 2 or 3, wherein said diffraction grating is of a reflection type.

5. The hard disc drive according to claim 1, 2, or 3, wherein said diffraction grating is formed of a hologram.

6. The hard disc drive according to claim 1, 2, or 3, wherein a pitch of said diffraction grating is set to be a pattern such that a track pitch of a disc becomes constant.

7. The hard disc drive according to claim 1, 2, or 3, wherein said diffraction grating has an original point formed thereon so as to determined the head position.

8. The hard disc drive according to claim 1, further comprising an optical system provided outside said casing for receiving the diffracted beam of light, said optical system including detecting means for detecting the head arm position, control means for controlling the head arm position, and servo signal writing means for writing a servo signal on the disc on the basis of a detected position signal.

9. The hard disc drive according to claim 8, wherein said optical system is formed as an optical interference type which causes light beams diffracted by the diffraction grating to interfere with one another.

10. The hard disc drive according to claim 4, wherein said diffraction grating is formed of a hologram.

11. The hard disc drive according to claim 4, wherein a pitch of said diffraction grating is set to be a pattern such that a track pitch of a disc becomes constant.

12. The hard disc drive according to claim 5, wherein a pitch of said diffraction grating is set to be a pattern such that a track pitch of a disc becomes constant.

13. The hard disc drive according to claim 4, wherein said diffraction grating has an original point formed thereon so as to determine the head position.

14. The hard disc drive according to claim 5, wherein said diffraction grating has an original point formed thereon so as to determine the head position.

15. The hard disc drive according to claim 6, wherein said diffraction grating has an original point formed thereon so as to determine the head position.

* * * * *

UNITED STATES PATENT AND TRADEMARK OFFICE
CERTIFICATE OF CORRECTION

PATENT NO. : 5,325,349
DATED : June 28, 1994
INVENTOR(S) : Kayoko TANIGUCHI

It is certified that error appears in the above-identified patent and that said Letter Patent is hereby corrected as shown below:

Col. 3, line 66, change "a" to --an--

Col. 4, line 65, change "driving" to --drive--
Col. 5, line 28, change "determined" to --determine--

Signed and Sealed this

Seventeenth Day of November, 1998

Attest:

BRUCE LEHMAN

*Attesting Officer*   *Commissioner of Patents and Trademarks*